United States Patent
Husemann et al.

(10) Patent No.: US 6,881,442 B2
(45) Date of Patent: Apr. 19, 2005

(54) CONTINUOUS TWO-STAGE PREPARATION OF SOLVENT-FREE POLYACRYLATE HOTMELT PSAS

(75) Inventors: Marc Husemann, Hamburg (DE); Stephan Zöllner, Hamburg (DE); Klaus Massow, Hamburg (DE); Frank Henke, Neu Wulmstorf (DE)

(73) Assignee: tesa Aktiengesellschaft, Hamburg (DE)

( * ) Notice: Subject to any disclaimer, the term of this patent is extended or adjusted under 35 U.S.C. 154(b) by 127 days.

(21) Appl. No.: 10/436,864

(22) Filed: May 13, 2003

(65) Prior Publication Data

US 2004/0024111 A1 Feb. 5, 2004

(51) Int. Cl.⁷ ............................ C09J 133/06; C08F 6/10
(52) U.S. Cl. .................... 427/208.4; 524/556; 524/560; 525/55; 526/931; 526/935
(58) Field of Search ........................ 525/55; 427/208.4; 526/931, 935; 524/556, 560

(56) References Cited

U.S. PATENT DOCUMENTS

| | | | |
|---|---|---|---|
| 5,073,611 A | 12/1991 | Rehmer et al. .............. | 526/208 |
| 5,726,245 A | 3/1998 | Numrich et al. .............. | 526/85 |
| 6,753,079 B1 * | 6/2004 | Husemann et al. ... | 428/355 AC |
| 2003/0082370 A1 | 5/2003 | Husemann et al. ......... | 428/343 |

FOREIGN PATENT DOCUMENTS

| | | | | |
|---|---|---|---|---|
| DE | 195 44 563 A1 | 6/1997 | ........... | C08L/33/12 |
| DE | 100 29 554 A1 | 1/2002 | .......... | C09J/133/12 |
| DE | 100 42 543 A1 | 3/2002 | ............. | C08F/6/06 |
| EP | 0 621 326 B1 | 6/1998 | ............... | C09J/7/02 |
| EP | 1 293 547 A1 | 3/2003 | .......... | C09J/133/06 |

OTHER PUBLICATIONS

PCT/EP01/06770—WO 01/96413, 2001.

* cited by examiner

Primary Examiner—Kelechi C. Egwim
(74) Attorney, Agent, or Firm—Norris McLaughlin & Marcus PA

(57) ABSTRACT

In a continuous two-stage process for preparing solvent-free polyacrylate hotmelt pressure sensitive adhesives which is gentle on the polymer and redeploys the solvent used in the process the following steps are carried out:

polymerizing a self-adhesive pressure sensitive adhesive in solution, the solvent having a low vapor pressure;

continuously mixing the polymer solution with antioxidants and preheating the mixture under superatmospheric pressure without boiling it;

concentrating the polymer solution to a residual solvent content of less than 0.1% by weight in a concentrating extruder under the effect of reduced pressure and elevated temperatures;

condensing, collecting, and re-using the solvent stripped off in the extruder;

compounding the abovementioned solvent-freed hotmelt pressure sensitive adhesive with tackifying resins, fillers, stabilizers, crosslinkers or other additives in a second extruder at a moderate melt temperature;

transferring the blended solvent-free self-adhesive pressure sensitive adhesive to a downstream coating unit.

12 Claims, 4 Drawing Sheets

Figure I:

CONTINUOUS TWO-STAGE PREPARATION OF SOLVENT-FREE POLYACRYLATE HOTMELT PSAS

The invention relates to a new and very efficient process for preparing acrylate hotmelts from solvent-containing polyacrylates.

BACKGROUND OF THE INVENTION

Within the field of pressure sensitive adhesives (PSAs), as a result of ongoing technological developments in the coating process, there exists a continuing demand for innovative developments. Within the industry, hotmelt processes with solvent-free coating technology are of growing importance for the production of PSAs, since the environmental impositions are becoming ever greater and the prices of solvent continue to rise. Consequently, solvents are to be eliminated as far as possible from the manufacturing operation for PSA tapes. However, these efforts are very hard to realize for acrylate PSAs, since these adhesives are still prepared in solvents, and implementing the polymerization in bulk is restricted by the excessive viscosity of the polyacrylates at high molecular weights. Furthermore, the gelling of bulk polymerizations is still a major problem. Gelled polyacrylates can no longer be used for coating and are therefore unsuitable as PSAs for adhesive tapes.

Furthermore, ever more exacting requirements are being imposed on adhesives, since for industrial applications there is a need for transparent PSAs which are stable both to weathering and to temperature (high level of cohesion even at relatively high temperatures) and which also exhibit little outgassing. These requirements can only be met by polyacrylates having a high molecular weight.

U.S. Pat. No. 5,073,611 discloses a relatively low molecular weight acrylate hotmelt which can be efficiently concentrated to the hotmelt and which, through a UV crosslinking mechanism, includes a cohesion-enhancing component. Owing to the low average molecular weight, however, the level of cohesion attained at room temperature and at high temperatures is not satisfactory.

Back in EP 0 621 326 B1 a concentration process for solventborne acrylate PSAs was described. In that batchwise process, high molecular weight acrylate PSAs are processed but the solvent is not recycled, so that with this process it is only possible to utilize the general advantages of hotmelt coating. Furthermore, the residence times are too long, resulting in damage to the polymer from the high temperature exposure (molecular weight degradation, gelling).

The object of the invention is therefore to provide a preparation process for hotmelt-processable polyacrylate PSAs which can be used to produce adhesive tapes, the process operating with little solvent and allowing what solvent there is to be recycled.

In the context of this invention it has been recognized that a low-solvent hotmelt process for polyacrylates is only realizable if the major part of the solvent is recycled and is passed back to the polymerization process. Furthermore, this process must also tolerate polyacrylates having a high molecular weight (about 800 000 g/mol), so that a high level of cohesion (shear strength) is achieved as a result of the long polymer chains. The combination of concentration with simultaneous solvent re-use presupposes that the polyacrylate has been polymerized to a high conversion (in order to avoid residual monomers) and that the system contains no resins or other additives which might release volatile constituents and so adversely affect the recycling concept. These requirements can only be met by a two-stage process.

A further critical point for a hotmelt process is the damage to the polymer as a result of temperature and shearing action. Excessive residence times and high shearing forces lead either to polymer degradation or to gelling of the PSA. Both effects are unwanted. The combination of a short residence time and low shearing force causes serious problems, since in order to realize short residence times it is necessary to operate the extruder at a high speed and thus a high specific drive energy. As a result of the high speed, the residence time is reduced but the shearing of the PSA, and hence the potential for polymer damage, is increased.

A further influence is exerted by the vapor pressure of the solvent. In order to ensure an efficient and gentle polyacrylate concentration process, these polymers are preferably prepared in solvents having a high vapor pressure, since by this means it is possible to achieve a higher concentration rate and it is necessary to introduce less specific energy in order to remove the solvent from the polymer.

Surprisingly and unforeseeably for the skilled worker the disadvantages depicted have been removed by the process of the present invention.

SUMMARY OF THE INVENTION

The invention features a continuous two-stage process for the preparation of substantially solvent-free polyacrylate hotmelt pressure sensitive adhesives which is gentle on the polymer and reemploys the solvent used in the process, and which comprises the following steps:

a) polymerizing a a monomer or monomer mixture to a monomer conversion of >99% in a solvent or solvent mixture having a vapor pressure temperature at 100 Pas of less than −10° C., to form a polymer solution;

b) continuously mixing the polymer solution with additives and auxiliaries, primarily with antioxidants, and preheating the mixture (preferably without boiling it) under superatmospheric pressure;

c) concentrating the polymer solution to a residual solvent content of less than 0.1% by weight in a first extruder, under the effect of reduced pressure and increased extruder temperatures, to form a polyacrylate presure sensitive adhesive, the specific drive energy for the polyacrylate pressure sensitive adhesives produced, having an average molecular mass $M_w$ of from 600 000 to 900 000 g/mol, being less than 0.18 kWh/kg, with particular preference less than 0.15 kWh/kg, while maintaining a temperature of the adhesive at the outlet of the extruder of not more than 135° C., with particular preference not more than 125° C.;

d) condensing, collecting, and re-using in (a) the solvent stripped off in the extruder, in a proportion of more than 80% of the amount used;

e) compounding the solvent-freed hotmelt pressure sensitive adhesive with tackifying resins, fillers, stabilizers, crosslinkers or other additives in a second extruder with a specific drive energy of less than 0.05 kWh/kg, preferably with a specific drive energy of less than 0.03 kWh/kg, while maintaining a temperature of the adhesive at the outlet of the extruder of not more than 125° C.; and f) transferring the blended solvent-free pressure sensitive adhesive to a downstream coating unit.

DETAILED DESCRIPTION

In one particularly advantageous development the polymers used have the following basic comonomer composition:

(A) 70–100 percent by weight of acrylic acid monomer, methacrylic acid monomer, an acrylate monomer and/or a methacrylate monomer of formula 1, $$CH_2=CH(R_1)(COOR_2) \qquad (I)$$

where $R_1$ is H or $CH_3$ and $R_2$ is H or an alkyl chain having 1–20 carbon atoms;

(B) 0–30 percent by weight of olefinically unsaturated monomers containing functional groups, at 0–30% by weight, based on component (A), and/or comprise one or more oligomers and/or prepolymers comprising one or more of said monomers.

The composition of the corresponding comonomers is chosen so that the resultant PSAs possess pressure sensitive adhesion properties in accordance with D. Satas [Handbook of Pressure Sensitive Adhesive Technology, 1989, Van Nostrand Reinhold, New York], the static glass transition temperature of the PSA here being preferably below 25° C.

In the first step, for the preparation of the acrylate PSA, a free or controlled radical polymerization is carried out. The radical polymerization is preferably conducted in the presence of an organic solvent. As little solvent as possible is used. Depending on conversion and temperature, the polymerization time is between 6 and 48 h. The average molecular weight of the polymers varies between 300 000 and 2 000 000 g/mol, more preferably between 600 000 and 900 000 g/mol. The conversion after the polymerization is >99%.

In order to obtain a high concentration rate for the polymer it is very preferable to use organic solvents or solvent mixtures having a vapor pressure temperature of <−10° C. in order to obtain a pressure of 100 Pa (D. R. Lide, CRC Handbook of Chemistry and Physics, CRC Press, 1999–2000, London). Preferred examples of the main solvent component may be esters of saturated carboxylic acids (such as ethyl acetate), aliphatic hydrocarbons (such as n-hexane or n-heptane) or ketones (such as acetone or methyl ethyl ketone). It is very preferable to use a solvent mixture of acetone and isopropanol in which the isopropanol content is between 1 and 10 percent by weight.

Polymerization initiators used are customary radical-forming compounds, such as peroxides and azo compounds, for example. Initiator mixtures can also be used. During the polymerization, thiols, nitroxides, 2,2,6,6-tetramethyl-1-piperidinyloxyl (TEMPO) derivatives or thioesters or thiocarbonates may be used as further regulators to lower the molecular weight and reduce the polydispersity. As further polymerization regulators it is also possible, for example, to use alcohols and ethers.

The polymerization for preparing the acrylate PSA may be conducted in polymerization reactors which in general are provided with a stirrer, two or more feed vessels, reflux condenser, heating, and cooling and which are equipped for operating under an $N_2$ atmosphere and superatmospheric pressure.

In the process of the invention, in the first stage, the solvent is removed under reduced pressure in a twin-screw concentrating extruder, the solvent preferably being distilled off in three reduced-pressure stages. The twin-screw extruder may be operated co-rotatingly or counter-rotatingly. In one preferred version of the concentrating extruder a high-volume extruder is used. As compared with the compounding extruder, the concentrating extruder possesses a free volume of more than 3, preference being given to a ratio of more than 3.5. As a result of the high concentration volumes, the concentrating extruder can be operated at low speed, the speed being definable by the specific drive energy. In order to ensure concentration which is gentle as far as the polymer is concerned, the polymer solution must be heated under superatmospheric pressure to temperatures between 100 and 160° C. before it enters the concentrating extruder, but the solvent/mixture should not boil. The entry temperature of the polymer solution is preferably between 110 and 150° C., very preferably between 120 and 140° C. An advantage of the high entry temperature of the polymer solution in conjunction with the high vapor pressure of the solvent is the ease with which the solvent/solvent mixture can be removed.

Furthermore, in order to ensure that the concentration of the PSA is gentle as far as the polymer is concerned, the specific drive energy must be below 0.18 kWh/kg. For a process particularly gentle on the polymer, and therefore a preferred process, concentration is carried out with a specific drive energy of less than 0.15 kWh/kg.

The concentration rate in the concentrating extruder is situated at a residual solvent fraction of <0.5%, more preferably <0.3%, very preferably <0.1%.

Furthermore, for further processing which is gentle on the polymer, the temperature of the PSA is critical. The exit temperature of the acrylate hotmelt after concentration is below 135° C., more preferably below 125° C. The low temperature prevents cracking (gelling) of the acrylate hotmelt.

In the process of the invention the solvent distilled off is condensed in a stock vessel and analyzed via gas chromatography (GC). The recycling rate is at least 80%. In the stock vessel or in a separate mixing vessel, fresh solvent is added. In one particularly advantageous development, for the acetone/isopropanol mixture, the original proportion is established again at the time of polymerization. The solvent blended and refreshed in this way is added again to the polymerization process in a recycling concept.

In the second step of the two-stage process, the acrylate hotmelt is blended inline with resins. The continuous operation is essential in order to achieve a short residence time in the process. For this purpose a compounder is used which in turn consists with particular advantage of a twin-screw extruder. The twin-screw extruder may be operated co-rotatingly or counter-rotatingly. The increased speed (and thus the increased specific drive energy) as compared with the concentrating extruder ensures that sufficient shear energy is introduced to effect efficient incorporation of resins or plasticizers. For the process of the invention, the specific drive energy of the compounder should be less than 0.05 kWh/kg. Damage to the polymer is prevented by the addition of resin or plasticizer, since these components act as "solvents" and so reduce the shearing action. The resins/plasticizers can be added as solids or from the melt. The addition of the resins in a second process step ensures that impurities from the resins or volatile constituents are unable to pass into the recycled solvent during concentration and so affect the recycling process.

As resins it is possible to use, for example, terpene resins, terpene-phenolic resins, $C_5$ and $C_9$ hydrocarbon resins, pinene resins, indene resins, and rosins, alone and also in combination with one another. In principle, however, it is possible to use any resins which are soluble in the corresponding-polyacrylate; reference may be made in particular to all aliphatic, aromatic, and alkylaromatic hydrocarbon resins, hydrocarbon resins based on single monomers, hydrogenated hydrocarbon resins, functional hydrocarbon resins, and natural resins.

As plasticizers it is possible, for example, to use low molecular weight polyacrylates, phthalates, poly(ethylene glycol)s or Poly(ethylene glycol)s functionalized by amino groups, or plasticizer resins. In one preferred development, phosphates/polyphosphates are used. The addition of additives to the acrylate PSAs after the concentration step prevents further contamination of the recycled solvent.

As antioxidants, it is possible, for example, to use phenols substituted by (stearically) hindered groups; hydroquinones, pyrocatechols, aromatic amines, metal complex compounds, organic sulfides, polysulfides, phosphites or phosphonates.

In the inline process it is additionally possible to mix radiation-crosslinking substances, such as polyfunctional acrylates or urethane acrylates, and also photoinitiators, into the acrylate melt. Photoinitiators which can be used include benzophenone, acetophenone, benzil, benzoin, hydroxyalkylphenone, phenylcyclohexyl ketone, anthraquinone, thioxanthone, triazine, and fluorenone derivatives, this list not being intended to be conclusive.

Furthermore, various fillers can be added in the inline process, such as carbon black, $TiO_2$, solid or hollow beads of glass or other materials, nucleating agents, blowing agents, compounding agents and/or aging inhibitors.

The acrylate hotmelt is applied from the melt onto a backing material. As backing material, for adhesive tapes, for example, it is possible in this case to use the materials customary and familiar to the skilled worker, such as films (polyester, polyethylene threphthalate (PET), polyethylene (PE), polypropylene (PP), biaxially oriented polypropylene (BOPP), polyvinylchloride (PVC)), nonwovens, foams, woven fabrics and woven films, and also release paper (glassine, high density polyethylene (HDPE), low density polyethylene (LDPE)). This list is not intended to be conclusive.

A development which makes the process of the invention especially favorable for the production of adhesive tapes, for example, is that wherein the pressure sensitive adhesive is crosslinked thermally, by UV radiation or by ionizing radiation, such as electron beams, for example.

The invention further provides for the use of the resulting pressure sensitive adhesive for an adhesive tape, in which the acrylate pressure sensitive adhesive is present in the form of a single-sided or double-sided film on a backing.

Through the process it is possible to produce PSA tapes having a high average molecular weight which possess shear strength. In contrast to the batchwise process, a continuous production operation is possible, so that the PSA is exposed to a thermal load only for a relatively short time. The inline admixture of the resins/plasticizers allows the variable preparation of pressure sensitive adhesives with a very different PSA profile. The two-stage process described in this invention ensures a high throughput for the concentration, short residence times, very low polymer damage, and the recycling of the solvent used for the polymerization.

BRIEF DESCRIPTION OF THE DRAWINGS

The invention is illustrated below by a number of examples, without wishing to subject it to any unnecessary restriction as a result. In the course of the illustration by means of examples, reference is also made to figures; in this context.

FIG. 1 shows the sequence of the process diagrammatically, in an overview. For the preparation of the polyacrylate PSA, a free or controlled radical polymerization of acrylate monomer or comonomer mixtures is first carried out in a polymerization reactor 1, which is provided with a stirrer, two or more feed vessels (not shown here) for the components, reflux condenser, heating and cooling, and is equipped for operating under a nitrogen atmosphere at superatmospheric pressure. The polymerized polyacrylate leaves the polymerization reactor via a line 2, which at the same time represents the feed of the solvent-containing polyacrylate to a first twin-screw extruder, a high-volume concentrating extruder 3. The entry temperature of the polyacrylate solution is 120–140° C. In the concentrating extruder 3 the solvent is removed under reduced pressure, in this example in three reduced-pressure stages. The concentrating extruder is operated at such a speed and with such a drive energy as to prevent long residence times. The concentrated polyacrylate hotmelt leaves the extruder 3 with a temperature of approximately 120° C. The solvent removed by distillation is condensed via a return line 5 into a solvent tank 6 and is analyzed by gas chromatography. Fresh solvent is added to the solvent tank 6 and the original mixing ratio for the polymerization is established again. The solvent blended and refreshed in this way is passed back to the polymerization reactor 1.

Figure 1:
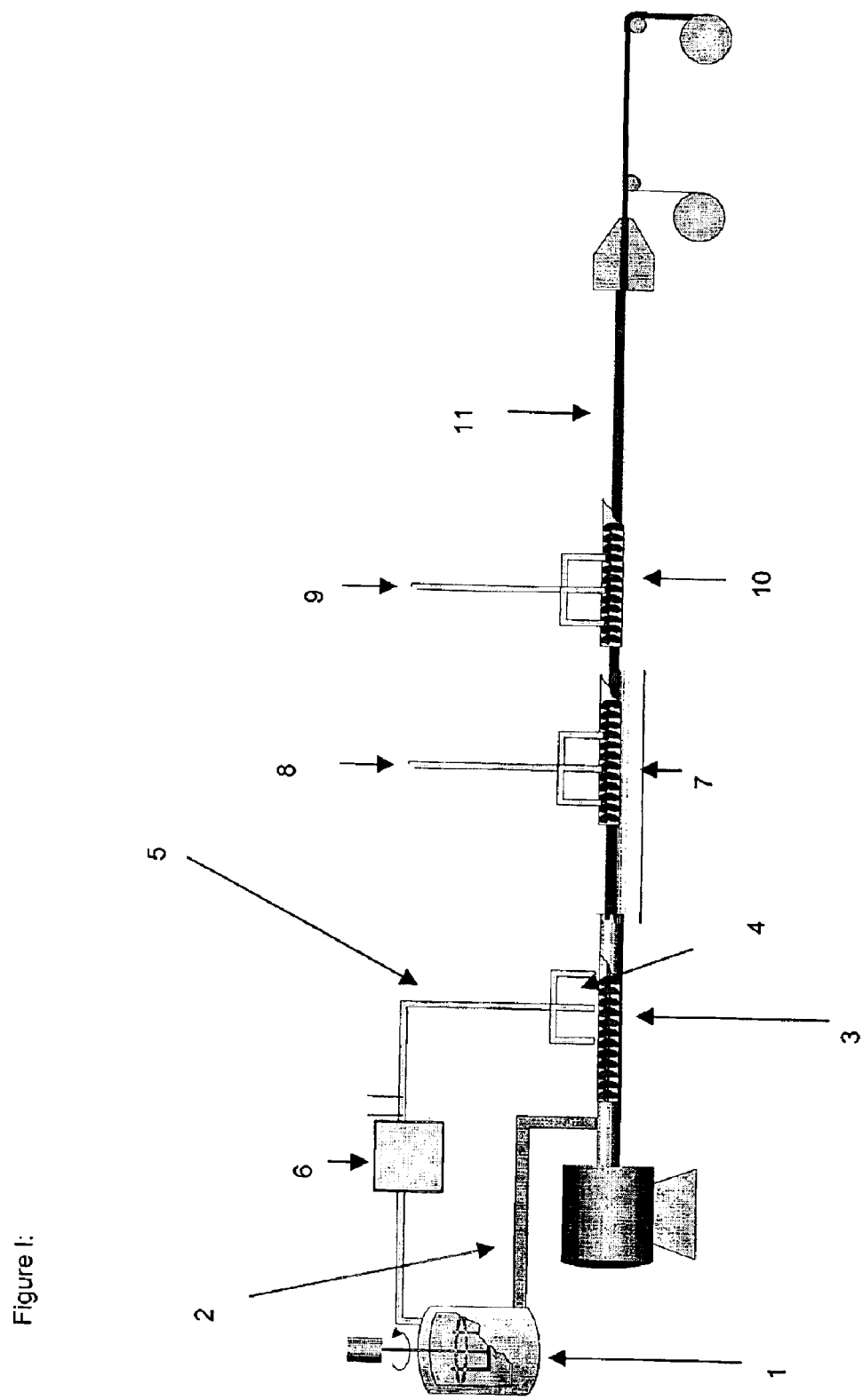
FIG. 1 is a diagram of the process sequence

In the second step of the process, the concentrated acrylate hotmelt is blended inline with resins. For this purpose the hotmelt coming from the extruder 3 is supplied to a compounding extruder 7. The compounder is composed in turn of a twin-screw extruder. At position 8, resins and plasticizers are introduced into the compounder 7; at position 9, aging inhibitors and crosslinkers are introduced into a further compounder, 10. The twin-screw extruders 3, 7, and 10 may be operated co-rotatingly or counter-rotatingly. Following its emergence from the final compounder, the blended hotmelt is supplied via path 11 to a coating unit, which is likewise indicated in the diagram. During compounding as well, the polymer is maintained at a temperature of not more than 125° C.

EXAMPLES

Below, a number of examples are given of acrylate hotmelt compositions, along with results of investigation of their properties.

Test Methods

The following test methods were employed in order to evaluate the properties of the acrylate hotmelts.

Determination of the Evaporation Rate (Test A)

A precise amount of the acrylate hotmelt, in an open container, was heated in a reduced-pressure oven at 140° C. and a pressure of 0.1 mbar for one hour. It was weighed again after the temperature treatment. The percentage decrease in the weight is correlated with the volatility.

Determination of the Molecular Weight by GPC (Test B)

The average molecular weights $M_n$ (numerical average) and $M_w$ (weight average) and the polydispersity D were determined by gel permeation chromatography. The mobile phase used was THF containing 0.1% by volume trifluoroacetic acid. Measurement was made at 25° C. The precolumn used was PSS-SDV, $5\mu$, $10^3$ Å, ID 8.0 mm×50 mm. Separation was carried out using the columns PSS-SDV, $5\mu$, $10^3$ and also $10^5$ and $10^6$ each of ID 8.0 mm×300 mm. The sample concentration was 4 g/l, the flow rate 1.0 ml per minute. Measurement was made against polystyrene standards.

Determination of the Gel Fraction (Test C)

The carefully dried, solvent-free samples of adhesive are welded into a pouch of polyethylene nonwoven (Tyvek web). The difference in the weights of the samples before and after extraction with toluene gives the gel value, i.e., the toluene-insoluble weight fraction of the polymer.

Samples Investigated

The samples used for the experiments were produced as follows:

The polymers were prepared conventionally by a free radical polymerization.

Example 1

A reactor conventional for radical polymerizations was charged with 80 kg of acrylic acid, 720 kg of 2-ethylhexyl acrylate, and 600 kg of acetone/isopropanol (97:3). After nitrogen gas had been passed through the reactor for 45 minutes with stirring, the reactor was heated to 58° C. and 400 g of Vazo 67™ (2,2'-azobis (2-methylbutyronitrile from DuPont) were added. The external heating bath was then heated to 75° C. and the reaction was carried out constantly at this external temperature. After a reaction time of one hour a further 400 g of Vazo 67™ (DuPont) were added. The reaction was terminated after a time of 48 hours and the reaction mixture was cooled to room temperature. It was analyzed by test method B. The adhesive was then freed from the solvent in a concentrating extruder (W&P ZSK 58, L=40 D). The extruder had a backward devolatilizer system and 3 further reduced-pressure stages. The reduced-pressure of the backward devolatilizer was 300 mbar, reduced-pressure stage 1 was operated at about 500 mbar, stage 2 at 250 mbar, and stage 3 at 10 mbar. The entry temperature of the polymer solution was approximately 140° C.

The speed was set at 210 revolutions per minute, so that the extruder was operated with a specific drive energy of 0.13 kWh/kg. The throughput was 160 kg/h feed solution. The exit temperature of the concentrated composition was found to be 135° C. The recovery rate was 90%. The solvent was collected from the first two reduced-pressure domes, condensed and recycled. The acrylate hotmelt was analyzed using test methods A and B. The residual solvent fraction in the hotmelt PSA was 0.07%.

The acrylate hotmelt was subsequently passed to a slot die and then coated at 50 g/m² onto a Saran-primed PET film. Following irradiation with an EB dose of 40 kGy, test method C was carried out.

Example 2

The adhesive from Example 1 was freed from the solvent in a counter-rotating twin-screw extruder from the company Welding Engineers. The extruder had a barrel length of 48 D with a screw diameter of approximately D=51 mm. The extruder possessed over 3 reduced-pressure stages, which were operated at about 100 mbar. The entry temperature of the polymer solution was 30° C. The speed was set at 103 revolutions per minute, so that the extruder was operated with a specific drive energy of 0.11 kWh/kg. The throughput was 40 kg/h feed solution. The exit temperature was 117° C. The recovery rate was 91%. The solvent was collected from the first two reduced-pressure domes, condensed and recycled. The acrylate hotmelt was analyzed by test methods A and B. The residual solvent fraction in the hotmelt PSA was 0.09%.

The acrylate hotmelt was subsequently passed to a slot die and then coated at 50 g/m² onto a Saran-primed PET film. Following irradiation with an EB dose of 40 kGy, test method C was carried out.

Example 3

The polymer from Example 1 was coated from solution onto a Saran-primed PET film, using a conventional doctor blade, and was dried at 120° C. for 10 minutes. The application rate was 50 g/m². Following irradiation with an EB dose of 40 kGy, test method C was carried out.

Figure 2:
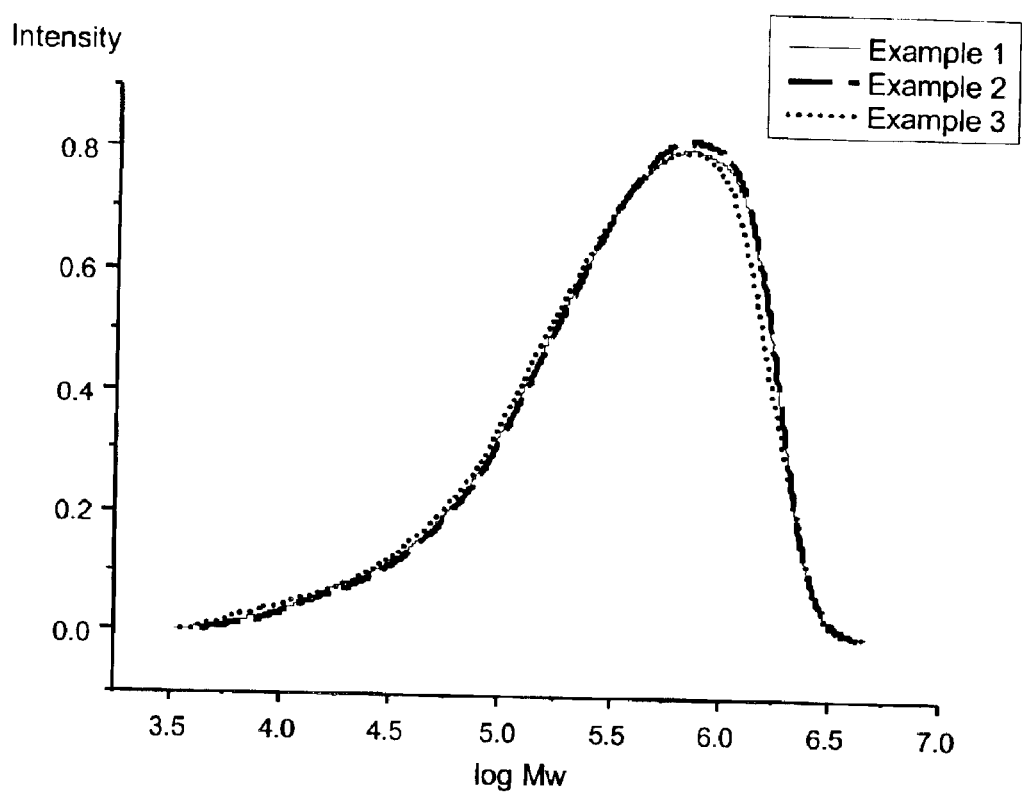
FIG. 2 is a comparison of the molecular weight distributions of Examples 1–3

FIG. 2 shows that the differences in the molecular weight distributions are very slight and therefore that the concentration process is very gentle to the polymer. Accordingly, both high-volume concentrating extruders produce very little shearing and so prevent molecular weight degradation of the polymer.

To assess the efficiency of the concentration process, the residual solvent fraction was measured after concentration. The measurements are shown in Table 1:

TABLE 1

| Example | Test A Weight loss [%] |
|---------|------------------------|
| 1       | 0.3                    |
| 2       | 0.2                    |

Generally, the fraction of volatile components for the acrylate hotmelts investigated is less than 0.5%.

For further examination, the specimens were used for coating again and then irradiated with the identical EB dose. The gel value of these specimens was then measured. For a given dose, a large reduction in molecular weight is reflected in a fall in gel value, since during EB irradiation the polymer chains are struck by the electrons randomly. Therefore, polymers with long polymer chains (high molecular weight) are crosslinked preferentially. The results of irradiation are listed in Table 2.

TABLE 2

| Example | Gel value [%] | EB dose [kGy] |
|---------|---------------|---------------|
| 1       | 54            | 40            |
| 2       | 53            | 40            |
| 3       | 54            | 40            |

50 g/m² application rate

All three examples show no influence in respect of EB-crosslinkability. The differences are within the bounds of measurement error, so that the concentration of the polymer leaves the quality of the PSA unaffected.

Below, the quality of the recycling concept is compared.

Example 4

A reactor conventional for radical polymerizations was charged with 80 kg of acrylic acid, 720 kg of 2-ethylhexyl acrylate, and 540 kg of recycled solvent from Example 1 plus 4.5 kg of isopropanol and 55.5 kg of acetone. After nitrogen gas had been passed through the reactor for 45 minutes with stirring, the reactor was heated to 58° C. and 400 g of Vazo 67™ (from DuPont) were added. The external heating bath was then heated to 75° C. and the reaction was carried out constantly at this external temperature. After a reaction time of one hour a further 400 g of Vazo 67™ (DuPont) were added. The reaction was terminated after a time of 48 hours and the reaction mixture was cooled to room temperature. It was analyzed by test method B. The adhesive was then freed from the solvent as in Example 1. The acrylate hotmelt was analyzed using test methods A and B.

The acrylate hotmelt was subsequently passed to a slot die and then coated at 50 g/m² onto a Saran-primed PET film.

Following irradiation with an EB dose of 40 kGy, test method C was carried out.

Figure 3:
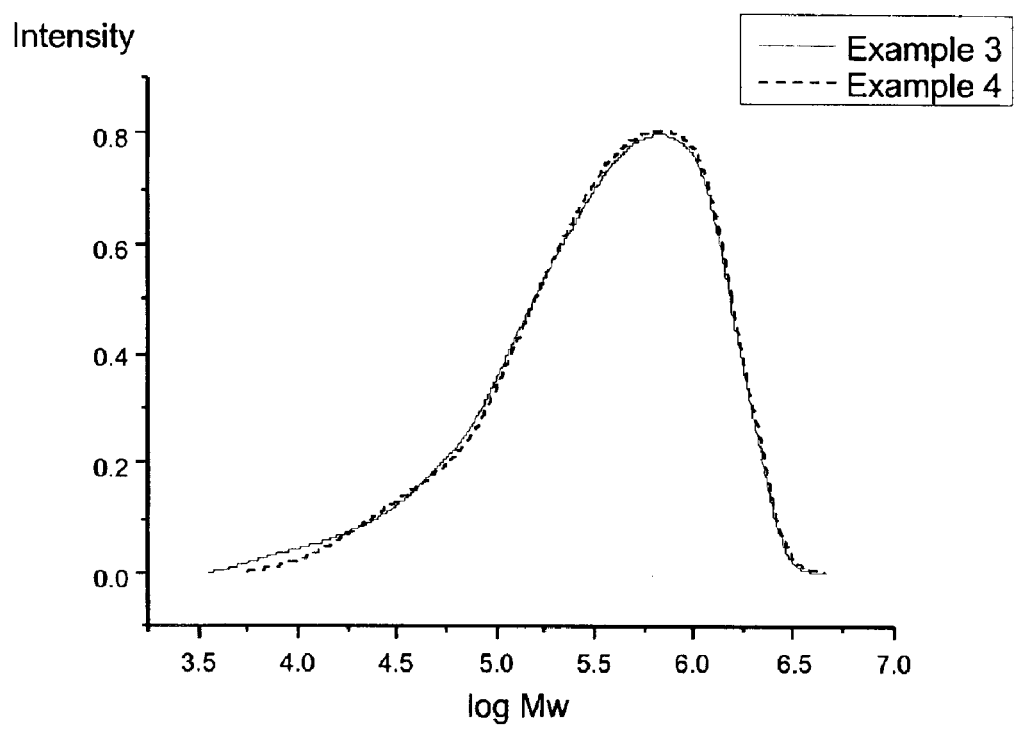
FIG. 3 is a comparison of the molecular weight distributions of Examples 3 and 4

FIG. 3 illustrates the fact that, with the recycled solvent, the molecular weight distribution achieved is virtually identical. With a relatively small fraction of fresh solvent (10%) it is possible to maintain the quality of the product. To investigate crosslinkability, Example 4 as well was also concentrated and crosslinked with electron beams.

TABLE 3

| Example | Gel value [%] | EB dose [kGy] |
|---|---|---|
| 3 | 54 | 40 |
| 4 | 54 | 40 |

50 g/m² application rate

Table 3 shows that the concentrated polyacrylate from Example 4 can be crosslinked with equal efficiency with an identical EB dose and therefore that there is no adverse effect on the technical adhesive properties.

In the following examples the inline operation with admixing of resin is described.

Example 5

A reactor conventional for radical polymerizations was charged with 8 kg of acrylic acid, 48 kg of N-tert-Butylacrylamide (NTBAM), 8 kg of maleic anhydride, 368 kg of 2-ethylhexyl acrylate, 368 kg of n-butyl acrylate and 600 kg of acetone/isopropanol (97:3). After nitrogen gas had been passed through the reactor for 45 minutes with stirring, the reactor was heated to 58° C. and 400 g of Vazo 67™ (from DuPont) were added. The external heating bath was then heated to 75° C. and the reaction was carried out constantly at this external temperature. After a reaction time of one hour a further 400 g of Vazo 67™ (DuPont) were added. The reaction was terminated after a time of 48 hours and the reaction mixture was cooled to room temperature. The adhesive was then freed from the solvent in a concentrating extruder (W&P ZSK 58, L=40 D). The reduced-pressure of the backward devolatilizer was 250 mbar and the 3 reduced-pressure stages were operated at about 300, 250, and 6 mbar. The entry temperature of the polymer solution was 110° C. The speed was set at 185 revolutions per minute, so that the extruder was operated with a specific drive energy of 0.12 kWh/kg. The throughput was 110 kg/h feed solution, corresponding to 51 kg/h concentrate. The exit temperature was found by measurement to be 117° C. The acrylate hotmelt was passed onto a second twin-screw extruder from Krupp Werner und Pfleiderer (KWP ZSK 40, L=36 D). The entry temperature of the acrylate hotmelt was 117° C. In the second extruder the concentrate was compounded with 12.6 kg/h resin Norsolene M1080™ (a $C_5$–$C_9$ hydrocarbon resin from Cray Valley), 6.3 kg/h resin Foral 85 (from Hercules) and 0.7 kg/h PETIA A mixture of pentaerythritol tri- and tetraacrylate from UCB). The extruder was operated with a speed of 210 revolutions per minute, with a specific drive energy of 0.009 kWh/kg. The overall throughput was 70 kg/h. The exit temperature was 114° C. For analysis, test method B was carried out.

The acrylate hotmelt was subsequently passed to a slot die and then coated at 50 g/m² onto a Saran-primed PET film. Following irradiation with an EB dose of 60 kGy, test method C was carried out.

Example 6

The polymer from Example 5 was blended in solution with 25 parts by weight of Norsolene M 1080™ (a hydrocarbon resin from Cray Valley), coated from solution onto a Saran-primed PET film, using a conventional doctor blade, and was dried at 120° C. for 10 minutes. The application rate was 50 g/m². Following irradiation with an EB dose of 60 kGy, test method C was carried out.

Figure 4:
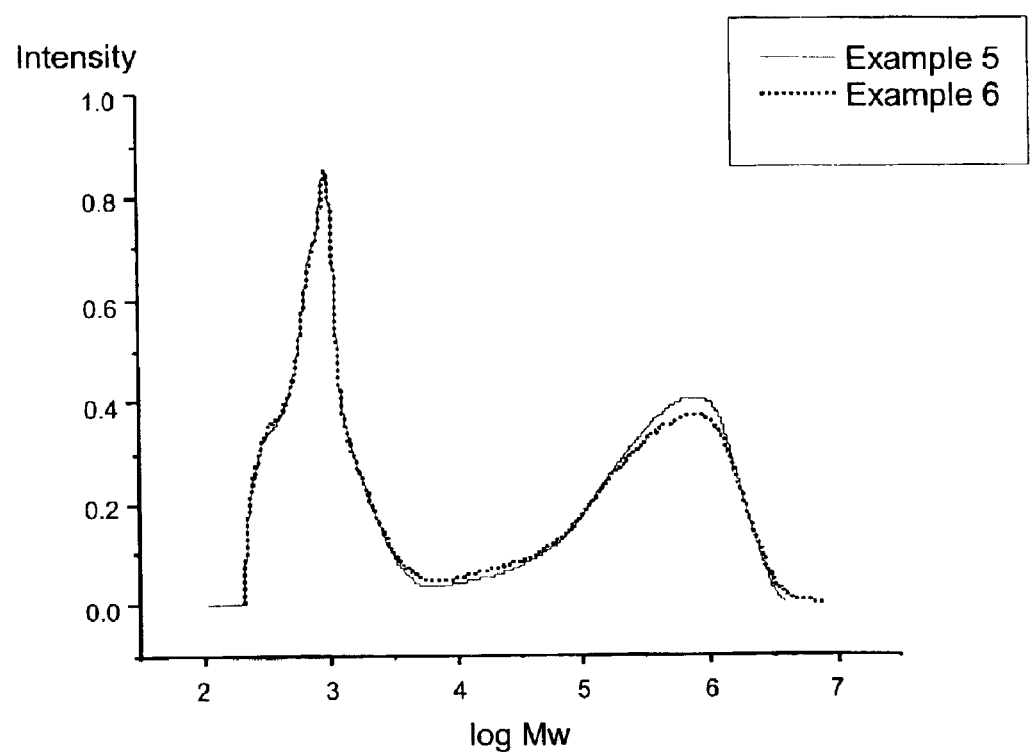
FIG. 4 is a comparison of the molecular weight distributions of Examples 5–6.

FIG. 4 illustrates that the differences in the molecular weight distributions are very slight and hence that the concentration of the polymer is very gentle and that even after addition of the resin by means of the compounder there is no further polymer damage. Both high-volume concentrating extruders therefore produce only a very low shear, and so prevent molecular weight degradation of the polymer. As a result of a twin-screw extruder with a relatively high speed it is possible to incorporate the resin very efficiently.

For further examination, the specimens were used for coating again and then irradiated with the identical EB dose. The gel value of these specimens was then measured. For a given dose, a large reduction in molecular weight is reflected in a fall in gel value, since during EB irradiation the polymer chains are struck by the electrons randomly. Therefore, polymers with long polymer chains (high molecular weight) are crosslinked preferentially. The results of irradiation are listed in Table 4.

TABLE 4

| Example | Gel value [%] | EB dose [kGy] |
|---|---|---|
| 5 | 41 | 60 |
| 6 | 40 | 60 |

50 g/m² application rate

All three examples show no influence in respect of EB-crosslinkability. The differences are within the bounds of measurement error, so that the concentration of the polymer leaves the quality of the PSA unaffected. The quality of compounding of the resin is also provided. If the resin had not been efficiently incorporated, differences would be expected in the quality of crosslinking as well.

Key to FIG. 1:
1. polymerization reactor
2. feed of the solvent-containing polyacrylate
3. concentrating extruder
4. reduced-pressure stages (several, in this case 3)
5. condensation section and return of the recycled solvent
6. solvent tank and setting of the appropriate mixing ratio
7. compounding extruder
8. addition of resins, plasticizers
9. addition of aging inhibitors, crosslinkers
10. compounding extruder
11. conveying of the acrylate hotmelt to the coating operation

We claim:

1. A continuous two-stage process for preparing solvent-free polyacrylate hot melt pressure sensitive adhesives which is gentle on the polymer and reemploys the solvent used in the process, and which comprises the following steps:
    a) polymerizing a composition comprising one or more monomers selected from the group consisting of acrylic acid, mathacrylic acid, acrylate monomers and methacrylate monomers and/or comprising one or more oligomers and/or prepolymers comprising one or more of said monomers, in a solvent or solvent mixture having a vapor pressure temperature at 100 Pas of less than −10° C. to a monomer conversion of >99% to form a polymer solution;

b) continuously mixing the polymer solution with additives and auxiliaries and preheating the mixture under superatmospheric pressure;

c) concentrating the polymer solution to a residual solvent content of less than 0.1% by weight in a first extruder, under the effect of reduced pressure and increased extruder temperatures to form a pressure sensitive adhesive, the specific drive energy for the polyacrylate pressure sensitive adhesives produced, having an average molecular mass $M_w$ of from 600 000 to 900 000 g/mol, being less than 0.18 kWh/kg, while maintaining a temperature of the adhesive at the outlet of the extruder of not more than 135° C.;

d) condensing, collecting, and re-using in step a) the solvent stripped off in the extruder, in a proportion of more than 80% of the amount used in step a);

e) compounding the solvent-freed pressure sensitive adhesive with tackifying resins, fillers, stabilizers, crosslinkers or other additives in a second extruder with a specific drive energy of less than 0.05 kWh/kg while maintaining a temperature of the adhesive at the outlet of the extruder of not more than 125° C.; and f) transferring the compounded solvent-free pressure sensitive adhesive to a downstream coating unit.

2. The process as claimed in claim 1, wherein antioxidants are added during the compounding step.

3. The process as claimed in claim 1, wherein said solvent is acetone or a solvent mixture in which acetone is the major constituent.

4. The process as claimed in claim 1, wherein said preheating comprises heating the mixture under elevated pressure to temperatures of between 100 and 160° C. before it enters the concentrating extruder, without the polymer solution being boiled.

5. The process as claimed in claim 4, wherein the the solvent used is a solvent mixture comprising more than 90% by weight acetone.

6. The process as claimed in claim 5, wherein the composition of the condensed solvent mixture is adjusted to the desired ratio of components in an intermediate tank by admixing of one or more components before the solvent mixture is reemployed for the polymerization.

7. The process as claimed in claim 1, wherein the concentration step is carried out in a twin screw extruder, and the compounding step is carried out in a twin screw extruder.

8. The process as claimed in claim 1, wherein the ratio of the free volume of the extruder used for the concentration step to the free volume of the extrucer used for the compounding step is more than 3.

9. The process of claim 4, wherein said temperature is between 110 and 150° C.

10. The process of claim 9 wherein said temperature is between 120 and 140° C.

11. The process of claim 5, wherein said solvent mixture comprises acetone in an amount of more than 95% by weight.

12. The process of claim 8, wherein said ratio is 3.5.

* * * * *

UNITED STATES PATENT AND TRADEMARK OFFICE
CERTIFICATE OF CORRECTION

PATENT NO.   : 6,881,442 B2
DATED        : April 19, 2005
INVENTOR(S)  : Husemann et al.

It is certified that error appears in the above-identified patent and that said Letters Patent is hereby corrected as shown below:

Title page,
Insert Item -- [30] Foreign Application Priority Data
May 14, 2002   (DE) ............... DE 102 21 402.6 --.

Column 4,
Line 54, "corresponding-polyacrylate" should read -- corresponding polyacrylate --.

Column 12,
Lines 6-7, "wherein the the solvent" should read -- wherein the solvent --.

Signed and Sealed this

Twenty-seventh Day of September, 2005

JON W. DUDAS
*Director of the United States Patent and Trademark Office*